(12) United States Patent
Downie et al.

(10) Patent No.: US 11,517,916 B2
(45) Date of Patent: Dec. 6, 2022

(54) MAGNETIC FILTER FOR A CENTRAL HEATING SYSTEM

(71) Applicant: ADEY HOLDINGS (2008) LIMITED, Cheltenham (GB)

(72) Inventors: Simon Downie, Cheltenham (GB); Kelvin Leung, Cheltenham (GB)

(73) Assignee: ADEY HOLDINGS (2008) LIMITED, Cheltenham (GB)

( * ) Notice: Subject to any disclaimer, the term of this patent is extended or adjusted under 35 U.S.C. 154(b) by 367 days.

(21) Appl. No.: 16/637,928

(22) PCT Filed: Jun. 27, 2018

(86) PCT No.: PCT/EP2018/067250
§ 371 (c)(1),
(2) Date: Feb. 10, 2020

(87) PCT Pub. No.: WO2019/029899
PCT Pub. Date: Feb. 14, 2019

(65) Prior Publication Data
US 2020/0179943 A1  Jun. 11, 2020

(30) Foreign Application Priority Data

Aug. 10, 2017 (GB) ..................... 1712822

(51) Int. Cl.
| | | |
|---|---|---|
| *B03C 1/033* | (2006.01) | |
| *B03C 1/28* | (2006.01) | |
| *F24D 19/00* | (2006.01) | |
| *B01D 35/06* | (2006.01) | |
| *B01D 35/30* | (2006.01) | |
| *C02F 1/48* | (2006.01) | |
| *B01D 35/147* | (2006.01) | |

(52) U.S. Cl.
CPC ............ *B03C 1/0332* (2013.01); *B01D 35/06* (2013.01); *B01D 35/147* (2013.01); *B01D 35/30* (2013.01);
(Continued)

(58) Field of Classification Search
CPC ....... B03C 1/0332; B03C 1/286; B03C 1/288; B03C 1/00; B03C 2201/18;
(Continued)

(56) References Cited

U.S. PATENT DOCUMENTS 3,669,148 A * 6/1972 Burkhalter, Jr ......... F16K 43/00
285/191
4,585,553 A * 4/1986 Hikosaka .................. B03C 1/30
210/111
(Continued)

FOREIGN PATENT DOCUMENTS

DE  843935 C   7/1952
EP  0921340 A2  6/1999
(Continued)

OTHER PUBLICATIONS

Sasserath DE 202015106890 (orginal and translation attached) (Year: 2017).*

*Primary Examiner* — Liam Royce
(74) *Attorney, Agent, or Firm* — Jacob M. Ward; Ward Law Office LLC (57) ABSTRACT

A magnetic filter for a central heating system is disclosed, the filter including a separation chamber, a magnet for capturing magnetic particles within the separation chamber, an inlet for fluidly connecting to a central heating system circuit, an outlet for fluidly connecting to a central heating system circuit, and a single valve operable to select between at least two positions, the valve in a first position fluidly connecting the inlet to the separation chamber and fluidly connecting the outlet to the separation chamber and the valve in a second position isolating both the inlet and the outlet from the separation chamber.

11 Claims, 7 Drawing Sheets

(52) U.S. Cl.
CPC .............. *B03C 1/286* (2013.01); *B03C 1/288* (2013.01); *C02F 1/48* (2013.01); *F24D 19/0092* (2013.01); *B03C 2201/18* (2013.01); *B03C 2201/28* (2013.01)

(58) Field of Classification Search
CPC .... B03C 2201/28; B01D 35/06; B01D 35/30; C02F 1/48; F24D 19/0092
See application file for complete search history.

(56) References Cited

U.S. PATENT DOCUMENTS

| | | | |
|---|---|---|---|
| 6,610,203 B1* | 8/2003 | Jainek | B01D 29/21 210/450 |
| 8,978,993 B1 | 3/2015 | Romero | |
| 2008/0029252 A1 | 2/2008 | Freije et al. | |
| 2010/0012574 A1* | 1/2010 | Walgren | B01D 29/96 210/416.4 |

FOREIGN PATENT DOCUMENTS

| | | | |
|---|---|---|---|
| EP | 2693129 A1 | 2/2014 | |
| EP | 3332855 A1 | 6/2018 | |
| GB | 1393181 A | 5/1975 | |
| GB | 2535500 A | 8/2016 | |
| GB | 2537152 A | 10/2016 | |
| WO | 9604062 A1 | 2/1996 | |
| WO | 2011055149 A2 | 5/2011 | |

* cited by examiner

MAGNETIC FILTER FOR A CENTRAL HEATING SYSTEM

CROSS-REFERENCE TO RELATED APPLICATIONS

This patent application is a United States National Stage of International Patent Application No. PCT/EP2018/067250, filed on Jun. 27, 2018, which in turn claims priority to Great Britain Patent Application No. 1712822.4, filed on Aug. 10, 2017. The entire disclosures of the above patent applications are hereby incorporated herein by reference.

TECHNICAL FIELD

The present invention relates to a magnetic filter for use in a central heating system.

BACKGROUND TO THE INVENTION

It is now common to fit magnetic filters to central heating systems to remove magnetic contamination from the system water, and in turn prevent damage to the boiler which can otherwise be caused when debris builds up in the heat exchanger. Filters are available in a variety of sizes, but in some installations where there is limited space, in particular underneath or above a boiler, there is still a demand for a smaller filter.

As well as the requirement for the filter to fit within the space once installed, installations with limited space can also present challenges for the installer to access the installation space and effect the installation.

Typically with existing filters, a section of pipe on the return side of the heating system circuit, close to the boiler, needs to be removed. The filter is then fitted into the heating system circuit via a pair of valves, i.e. there is a valve between the inlet to the filter and the system circuit and there is another valve between the outlet from the filter and the system circuit. This allows the filter to be isolated from the (normally pressurized) system circuit so that it can be depressurized and opened for cleaning.

Fitting the valves and the filter in a tight space can be difficult. Furthermore, attempts to reduce the overall fitted size of the filter have been limited by the need to provide a pair of valves on the inlet and outlet.

It is an object of the invention to provide a filter which can more easily be fitted into small spaces.

Filters typically need to be opened for cleaning, i.e. to remove captured magnetic particles. The separation chamber is normally closed by a lid, and an O-ring seal is provided between the lid and the canister to provide a watertight and gastight seal when the separation chamber is closed. The lid is typically attached to the separation chamber by means of a screw thread. When the lid is tightened, the O-ring is compressed. The O-ring reacts by pushing the lid and the separation chamber away from each other which puts tension in the thread, preventing the lid from unscrewing for example due to vibration. However, if the lid is overtightened onto the O-ring then the seal may be damaged. Some filters have been produced with stop faces to limit compression of the O-ring and prevent overtightening. However, this also limits the ability of the O-ring to lock the screw thread and prevent the lid from coming undone due to vibration. It is a further object of the invention to solve this problem.

SUMMARY OF THE INVENTION

According to the present invention, there is provided a magnetic filter for a central heating system, the filter including a separation chamber, a magnet for capturing magnetic particles within the separation chamber, an inlet for fluidly connecting to a central heating system circuit, an outlet for fluidly connecting to a central heating system circuit, and a single valve operable to select between at least two positions, the valve in a first position fluidly connecting the inlet to the separation chamber and fluidly connecting the outlet to the separation chamber and the valve in a second position isolating both the inlet and the outlet from the separation chamber.

By providing a single valve to isolate both the inlet and outlet from the separation chamber, a more compact filter can be produced. In particular, the vertical distance required on vertical pipework (which is typical above or below a boiler) is significantly reduced. The single valve can be used to isolate the filter from the central heating system to allow captured particles to be removed.

Preferably, the valve in the second position isolates both the inlet and the outlet from the separation chamber but fluidly connects the inlet to the outlet. In other words, the valve in the second position may operate as a bypass to allow water to continue to flow around the central heating system circuit while the filter is isolated for cleaning.

Preferably, the valve is a ball valve. The ball of the valve may include two substantially right-angled passages for connecting the inlet and outlet respectively to the separation chamber, when the valve is in the first position. Preferably, the ball may be provided within a valve housing which includes a bypass chamber substantially opposite the separation chamber. Therefore, the valve can be rotated 180 degrees so that the ends of the right-angled passages which face into the separation chamber in the first position face into the bypass chamber in the second position. This isolates the separation chamber completely but still allows water to flow in the central heating circuit, via the two right-angled passages in the ball of the valve and through the bypass chamber in the valve housing. The two right-angled passages each have two 'legs', perpendicular to each other. In many embodiments, the leg of the right angled passage which connects with the inlet will be directly in line with the leg of the other right angled passage which connects with the outlet. The other legs will then lie substantially parallel to each other, to interface with the separation chamber. In one embodiment, the leg of one right angled passage substantially surrounds the parallel leg of the other right angled passage, forming a concentric interface with the separation chamber.

In one embodiment, the inlet and outlet are provided substantially in-line with one another. The separation chamber may extend substantially perpendicularly from the line of the inlet and outlet, and the bypass chamber may be provided in the valve housing opposite the separation chamber. An interface between the valve and the separation chamber may be provided whereby a flow path from the valve into the separation chamber is substantially concentric with a flow path out of the separation chamber and back to the valve. Flow guides may be provided for directing flow, in particular to separate inlet and outlet flow paths close to the valve interface to ensure that a substantial portion of flow is close to the magnet. The magnet is preferably provided within the separation chamber but could alternatively be provided outside the separation chamber, against the wall of the separation chamber, for attracting magnetic particles from the flow.

In one embodiment, the flow path out of the separation chamber is disposed centrally on the interface between the separation chamber and the ball valve, and the flow path into the separation chamber is disposed around the outside of the flow path out of the separation chamber, the flow paths being concentric with each other. A flow guide may be provided which includes flow directors positioned to cause fluid flowing into the separation chamber to swirl. This increases the effectiveness of separation by increasing the probability that a given particle will flow close enough to the magnet to be captured by the magnet.

Preferably, the magnet is provided at the opposite end of the separation chamber to the interface with the ball valve. The magnet is preferably short enough to leave a space between the end of the magnet and the interface with the ball valve. This allows the size of the separation chamber to be kept small, since the interior dimensions of the separation chamber around the area where the magnet is located can in principle be just enough or even less than the amount of space taken up by magnetic particles at the maximum capturing capacity of the magnet. In the event that the filter becomes completely full, flow through the system circuit can still carry on through the part of the separation chamber between the end of the magnet and the interface with the valve. The magnet is preferably an assembly of magnets in the form of a column, the magnets of the assembly being arranged with like poles facing each other. The magnetic field lines of the assembly are therefore substantially in the direction out of the sides of the column, and this is where captured magnetic particles will collect.

According to a second aspect of the present invention, there is provided a magnetic filter for a central heating system, the magnetic filter including a separation chamber having an open end, a magnet for capturing magnetic particles within the separation chamber, and a closure for closing the open end of the separation chamber, the closure being releasably attachable to the separation chamber by a screw thread, and a compressible seal being provided between the closure and the separation chamber, a stop face being provided to limit the maximum compression of the compressible seal, and a removable clip being provided for preventing rotation of the screw thread when the clip is fitted.

The removable clip prevents rotation of the screw thread. This means that the O-ring is no longer relied upon to lock the thread. A stop face can therefore be provided to limit compression of the O-ring, which ensures that the O-ring seal will last a long time and still provide a good watertight and gastight seal between the separation chamber and the closure, even after multiple disassembly and reassembly operations to clean the filter.

The closure may include other components, for example a valve for interfacing with the central heating system circuit. In other embodiments, the closure may be a simple lid with the interface with the heating system circuit being provided on the separation chamber. In each case though, it is critical that the closure is correctly sealed to separation chamber in use, that the seal is not liable to become damaged with repeated use or with possible overtightening, and that the screw thread will not move unintentionally due to vibration.

The magnet is for capturing magnetic particles within the separation chamber. However, it is not strictly necessary for the magnet itself to be disposed within the separation chamber. For example, the magnet could be disposed outside the separation chamber, against the wall of the separation chamber, for capturing magnetic particles against the inner wall of the separation chamber.

The screw thread connection may be in the form of a thread on each of the separation chamber and the closure. Alternatively, a separate rotatable screw-threaded ring may be provided, having a flange for bearing against a corresponding flange on either of the separation chamber or the closure. This allows the separation chamber to be connected to the closure without having to rotate those two components with respect to each other. This is advantageous where there are parts on both the separation chamber and the filter which need to be in particular positions when assembled. For example, if the interface with the heating system is on the closure then the closure is effectively in a fixed position, and if a bleed valve is provided on the separation chamber then the separation chamber will need to be mounted with the bleed valve at the top. Even if there is no particular technical constraint, it is still advantageous to be able to assemble the filter with the canister and fitment in any relative position, even if only to ensure logos and/or other indicia are the correct way up.

The stop face may be provided as any rigid surface on either of the closure or the separation chamber, which will contact with the other of the closure or the separation chamber and prevent further compression of the O-ring seal once contact is made. This may amount simply to providing the O-ring in a groove which is deep enough that when the O-ring is compressed so that it sits entirely within the groove, it is not compressed enough to cause any damage. At the same time, the outward force provided by the O-ring to lock the thread will be smaller than the force provided by an O-ring which has been compressed more. Therefore, to prevent the screw thread from working loose due to vibration, a clip is provided to link the two screw-threaded parts together and prevent relative rotation while the clip is fitted. For example, when the screw thread is between a ring and a closure, the clip will connect the ring and closure together. Where a separately rotatable ring is provided, the clip will be provided between the ring and the closure, or between the ring and the separation chamber, depending on which of the closure and the separation chamber has the other screw thread. If the screw thread is provided directly between the separation chamber and the closure, then the clip will need to be provided between the separation chamber and the closure.

Preferably, the clip is a resilient clip, which may be made for example from spring steel.

According to a third aspect of the invention, there is provided a magnetic filter for a central heating system, the magnetic filter including an inlet and an outlet for connection to a central heating system circuit, the inlet and outlet being provided in-line with each other, one of the inlet and outlet being provided in the form of a socket for accepting an open end of a pipe of a central heating system circuit, and the other of the inlet and outlet being provided as a pipe for insertion into a socket, and a sleeve being provided, the sleeve having a socket at either end, and the sleeve being slidable longitudinally along a pipe to position the sleeve on the pipe, and means being provided at either end of the sleeve for fixing and sealing the sleeve to link the pipe of the magnetic filter to a pipe of a central heating system circuit.

In use, a section of pipe can be removed from the central heating system circuit. It is relatively easy to measure and cut out a section of pipe to a tolerance of a few millimetres, which is entirely adequate. Once a section of pipe has been removed, the double ended socket (sleeve) can be slid over one of the open ends of the pipe. The sleeve is slidable completely onto the open end of the central heating system pipe, so the space between the two open ends of the pipe is not reduced when the sleeve is over one open end in this way. The socket on the filter can then be inserted over whichever open end of the pipe does not have the sleeve on it. The length of section removed from the pipe is preferably about the same as (or very slightly more than) the total length between the ends of the inlet and outlet of the filter, so the socket of the filter may be inserted over one open end of the central heating system pipe easily, without having to manipulate the pipe away from the wall in any way. Once the socket of the filter is fitted over one open end of the pipe, the sleeve may be slid along the other open end to a position where it bridges between the pipe of the central heating system circuit and the pipe of the magnetic filter. Once in position, the sleeve may be fixed and sealed at either end.

Preferably, the means for fixing and sealing the sleeve to the pipe at either end are compression fittings of known design. However, the sleeve could alternatively be soldered or sealed by another means. It is not even strictly necessary for the fixing and sealing means on each end of the sleeve to be the same, or for either fixing on the sleeve to be the same as the fixing on the socket of the filter.

According to a fourth aspect of the invention, there is provided a method of fitting a magnetic filter to a central heating system pipe, the magnetic filter having an inlet and an outlet in line with each other, one of the inlet and outlet being in the form of a socket, and the other of the inlet and outlet being in the form of a pipe, the method comprising the steps of:

cutting the central heating system pipe to remove a section of a length equal to or greater than the distance between the ends of the inlet and outlet of the filter, to create two open ends of central heating system pipe;

inserting a sleeve having a socket at either end over one of the open ends, and sliding the sleeve completely over the central heating system pipe;

inserting the socket of the magnetic filter over the other open end of the pipe;

sliding the sleeve to bridge between the central heating system pipe and the pipe of the magnetic filter.

The three sockets (the one socket of the magnetic filter and the socket at each end of the sleeve) are sealed against the respective pipes. In the case of the socket on the magnetic filter, this can be done before or after the sleeve is moved into its bridging position. Preferably, the sockets are fixed and sealed to the pipes using compression fittings, although soldering or using other means is also possible.

DESCRIPTION OF THE DRAWINGS

For a better understanding of the invention, and to show more clearly how it may be carried into effect, specific embodiments will now be described by way of example only, with reference to the accompanying drawings in which.

DESCRIPTION OF THE EMBODIMENTS

Figure 1:
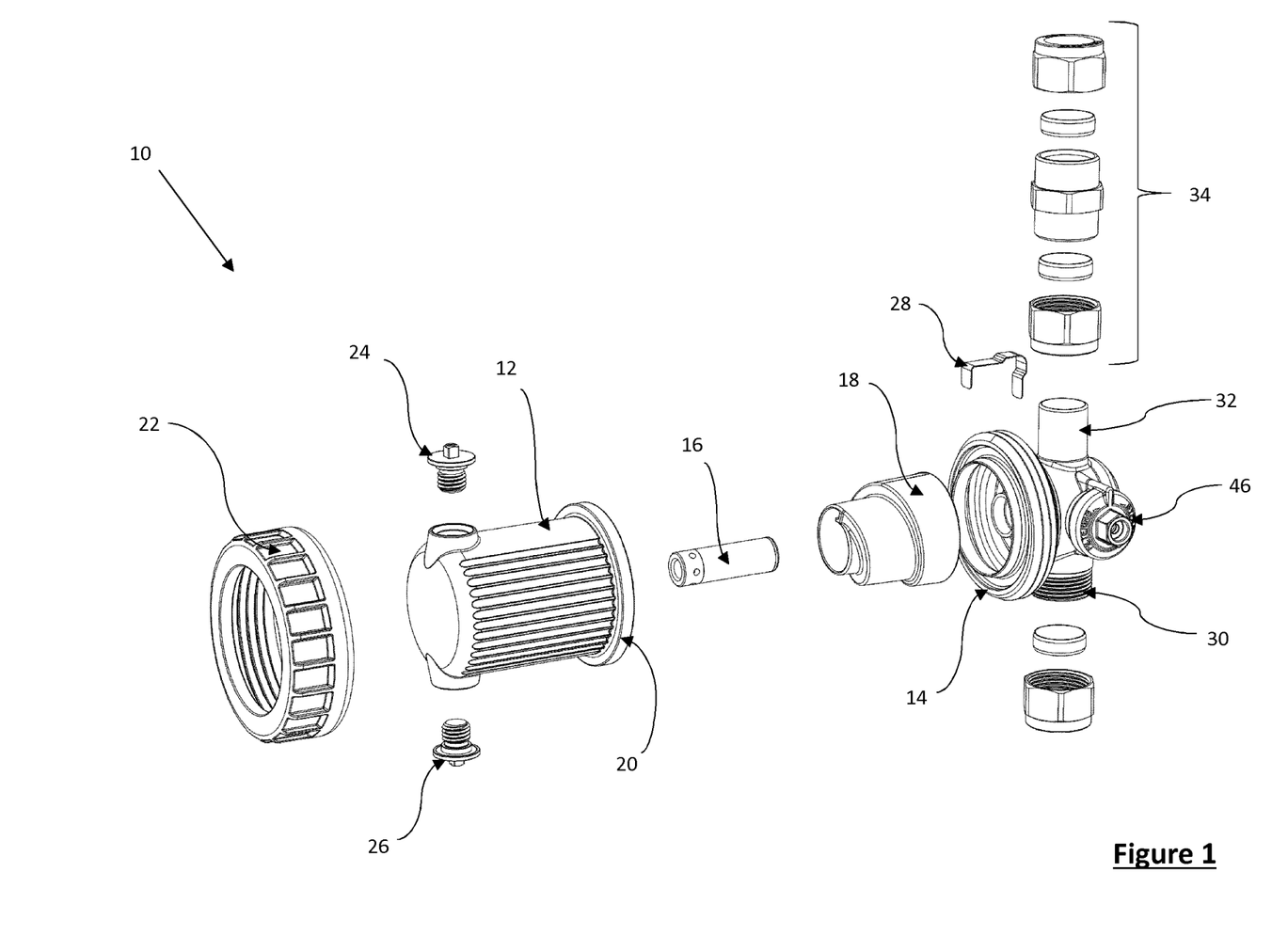
FIG. 1 is an exploded perspective view of a filter according to the invention.

Referring firstly to FIG. 1, a first embodiment of a magnetic filter is indicated generally at 10. The filter includes a separation chamber in the form of a canister 12. The canister 12 is open at one end, and the open end fits onto a fitment 14 which closes the canister 12. The separation chamber contains a magnet 16 which in use attracts and retains magnetic particles to clean the central heating system water. A flow director 18 is provided which causes flow entering the separation chamber 12 from the fitment 14 to swirl, and also directs the flow to enhance the effectiveness of separation by ensuring that a substantial proportion of the flow will come close enough to the magnet for particles to be captured. The flow director is disposed at the interface between the fitment 14 and the separation chamber 12.

A flange 20 is provided around the open end of the canister 12. A threaded ring 22 sits behind the flange (i.e. on the opposite side of the flange 20 to the fitment 14). The threaded ring 22 has an internal screw thread corresponding with an external screw thread on the fitment 14, and therefore when fitted holds the canister 12 against the fitment 14. A clip 28 prevents relative rotation between the ring 22 and the fitment 14 when fitted.

To the right hand side of FIG. 1, the means of fitting the filter 10 to a central heating system is visible. Inlet and outlet ports are provided, in this embodiment the inlet 30 is at the bottom of FIG. 1 and the outlet 32 is at the top of FIG. 1. This configuration is correct when fitting the filter to the central heating circuit return pipe, underneath the boiler. If in a particular installation the return pipe is above the boiler, then the fitment 14 can be inverted. The separation chamber may be retained in the same orientation, to keep the bleed valve 24 and drain port 26 in the correct locations, although in some embodiments the bleed 24 and drain 26 may in fact be provided as identical fittings, making orientation of the canister 12 unimportant. Nevertheless the separately rotatable ring 22 allows the fitment 14 and canister 12 to be assembled and sealed together in any relative position.

The inlet port 30 is provided as a socket for fitting over a pipe. The inlet port 30 in this embodiment is a standard compression socket of known design. The outlet port 32 is in the form of a pipe for fitting into a socket. A double ended socket or sleeve 34 is separately provided. When installed, the sleeve bridges between the outlet port pipe 32 of the filter and a similar pipe which forms part of the central heating system circuit. Again, each end of the double ended socket is provided substantially in the form of a known compression socket, having a compressible olive and a nut to compress the olive and form a seal. The double ended socket has no interior pipe stops and so can slide freely up and down a pipe of appropriate diameter.

A bleed valve 24 and a drain port 26 are provided at the top and bottom respectively of the canister 12.

Figure 2:
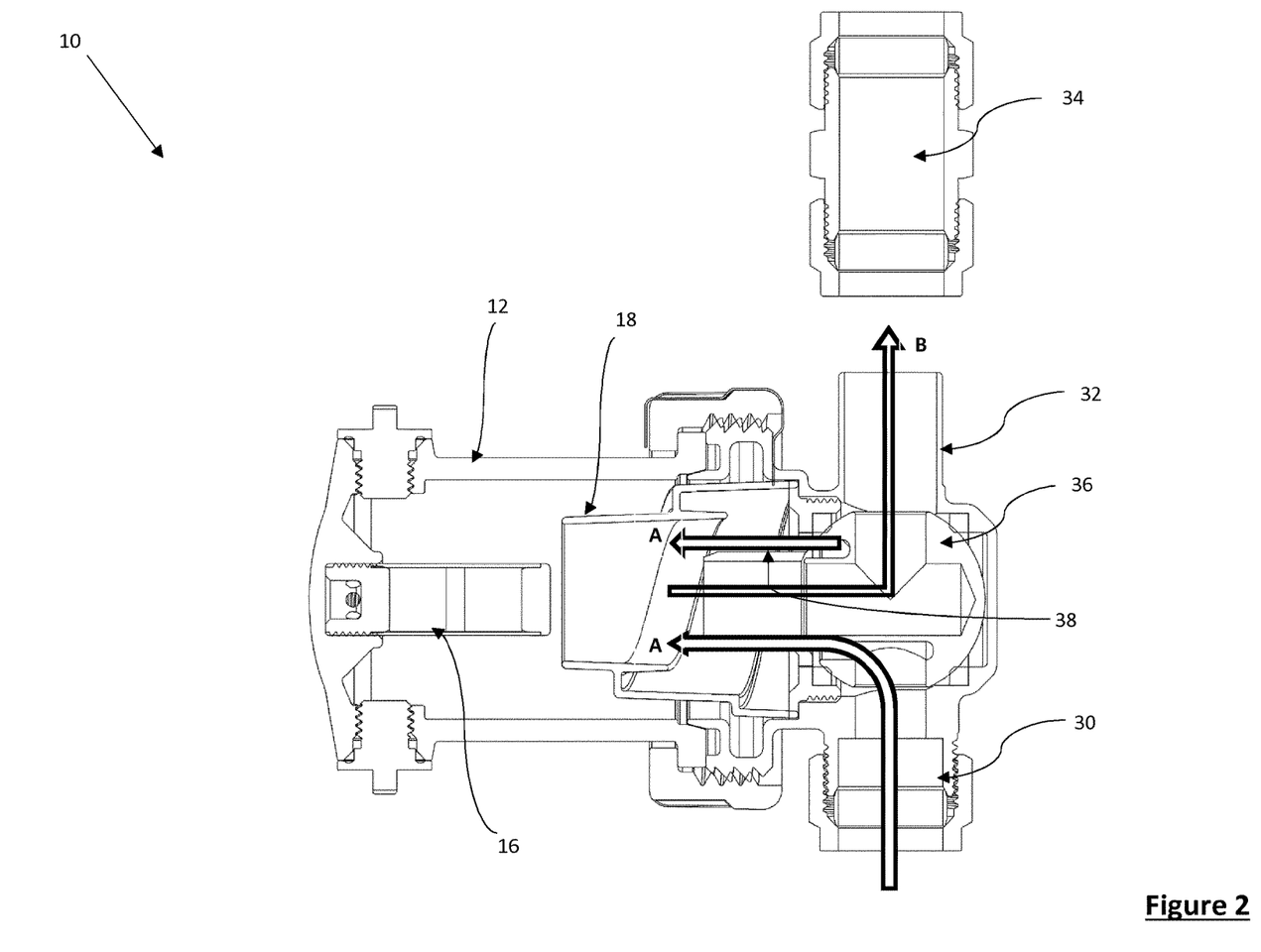
FIG. 2 is a cross section of the filter of FIG. 1.

Referring now to FIG. 2, flow paths through the filter 10 will be described in more detail. A single ball valve 36 is provided between the inlet 30, the outlet 32 and the separation chamber 12. In FIG. 2 the ball valve is shown in a first position in which the inlet 30 is fluidly connected to the separation chamber 12 and the outlet 32 is also fluidly connected to the separation chamber 12. The valve 36 is also movable into a second position where the separation chamber is isolated from the inlet and the outlet (see FIG. 6, second embodiment, the valve arrangement is the same). The valve is movable by means of an external handle (46, FIG. 1). With the valve 36 in the first position, central heating system water enters through the inlet 30, through a passage in the valve 36, and enters the separation chamber 12 through a ring-shaped interface (arrows A). On entry to the separation chamber 12, the flow director 18 causes the water to swirl, and also directs a substantial portion of the flow towards and around the magnet 16, where magnetic particles are captured and retained. Fluid then leaves the separation chamber via a central interface 38, which is concentric with the ring-shaped interface. The fluid passes through a second passage in the valve ball 36 and leaves the filter 10 via the outlet 32 (arrows B).

Figure 3:
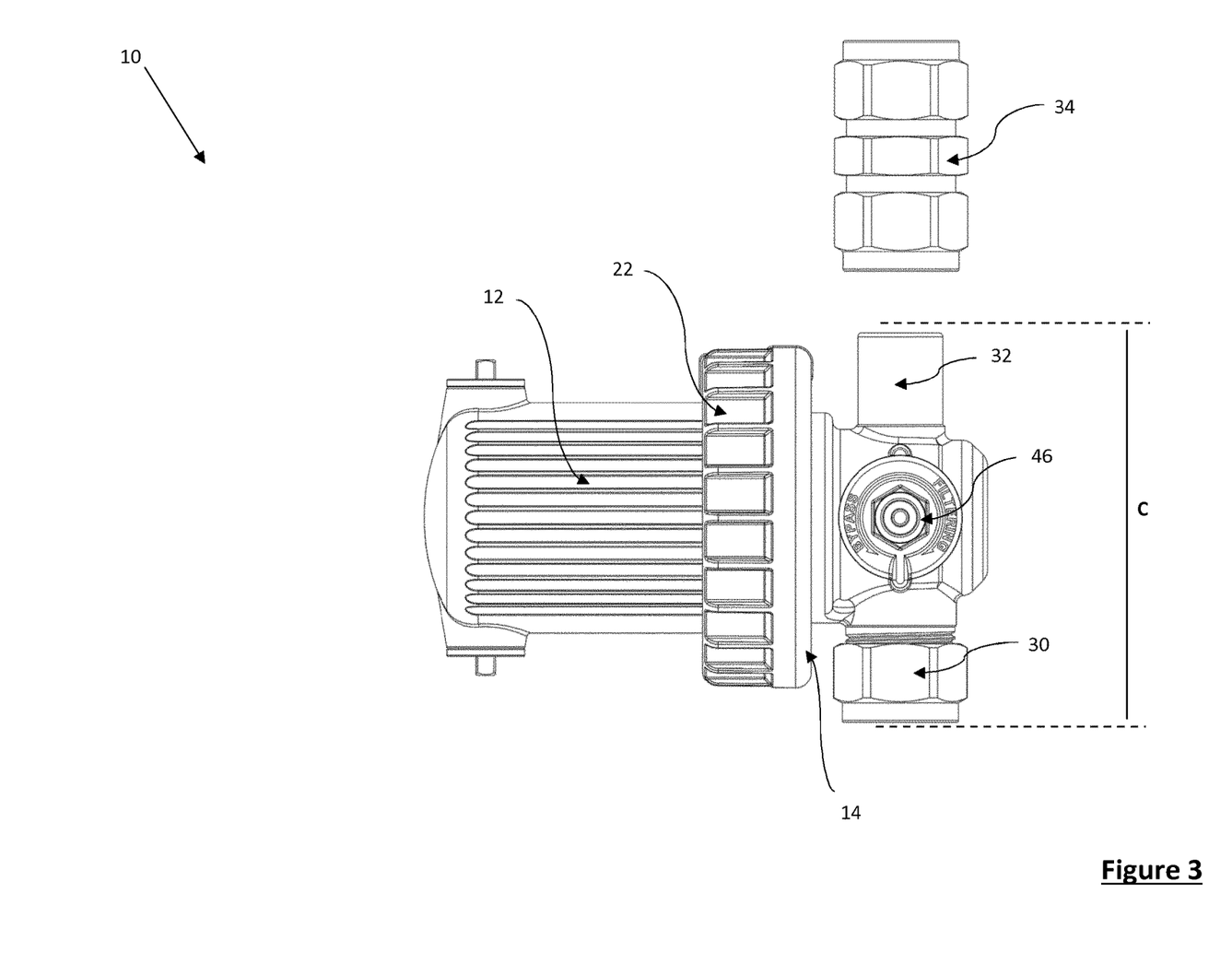
FIG. 3 is a view from the side of the filter of FIG. 1.

FIG. 3 shows the filter of FIGS. 1 and 2 fully assembled. To fit the filter to a vertical central heating system pipe, first a section of pipe is removed. The section of pipe removed is preferably slightly longer, say 2-3 mm longer, than the distance between the ends of the ports (dimension C in FIG. 3). Removing a section of central heating system pipe leaves two open ends. The double ended socket/sleeve 34 is slid completely over one of the open ends (the upper end in this example). The sleeve 34 is positioned entirely over the pipe so that the free vertical distance between the open ends of the pipe is not reduced by introducing the sleeve 34. Therefore the entirety of the filter will easily fit between the open ends of the pipe. The other open end (the lower end in this example) can then be introduced into the inlet socket 30 of the filter 10. The compression nut on the inlet socket 30 can be tightened to make this connection permanent (although the tightening step could optionally be left until last). Once the lower pipe is inserted into the socket 30, the sleeve 34 may be slid back down the upper pipe so that the sleeve bridges between the upper pipe end of the central heating system circuit and the inlet pipe 32 of the filter 10. The compression fittings at either end of the sleeve 34 are then tightened to make this connection permanent as well. The procedure described allows the filter to be fitted very easily, even where space is limited.

Figure 4:
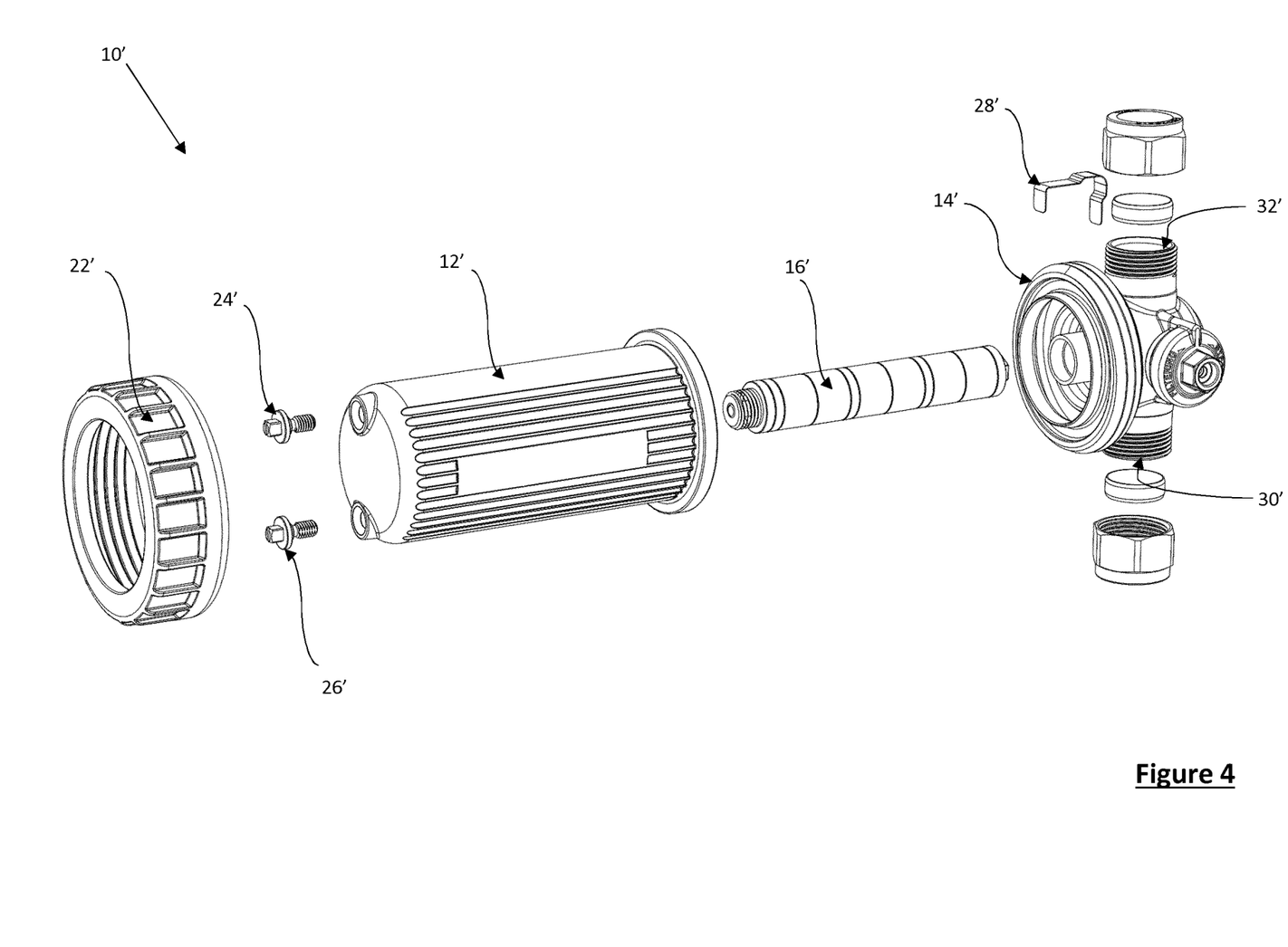
FIG. 4 is an exploded perspective view of a second embodiment of a filter according to the invention.

Referring now to FIG. 4, a second embodiment of a filter 10' is shown. The filter 10' is in many respects similar to the first embodiment 10, the visual differences mainly relate to design and not technical function. The magnet 16' is longer, and the separation chamber/canister 12' is correspondingly longer to contain it. This allows a less expensive type of magnet to be used (for example a ferrite magnet rather than a neodymium magnet as used in the first embodiment), whilst maintaining filter capacity by providing a large size of magnet. By extending the separation chamber 12 in a direction perpendicular to the central heating system pipe (which will typically run against a wall), the vertical space taken up by the filter is not increased.

In this embodiment, the double-ended socket/sleeve (34) is not provided. Both the inlet 30' and outlet 32' are in the form of known compression fittings. Some manipulation of the central heating system pipework will therefore be necessary when fitting the filter 10'.

Figure 5:
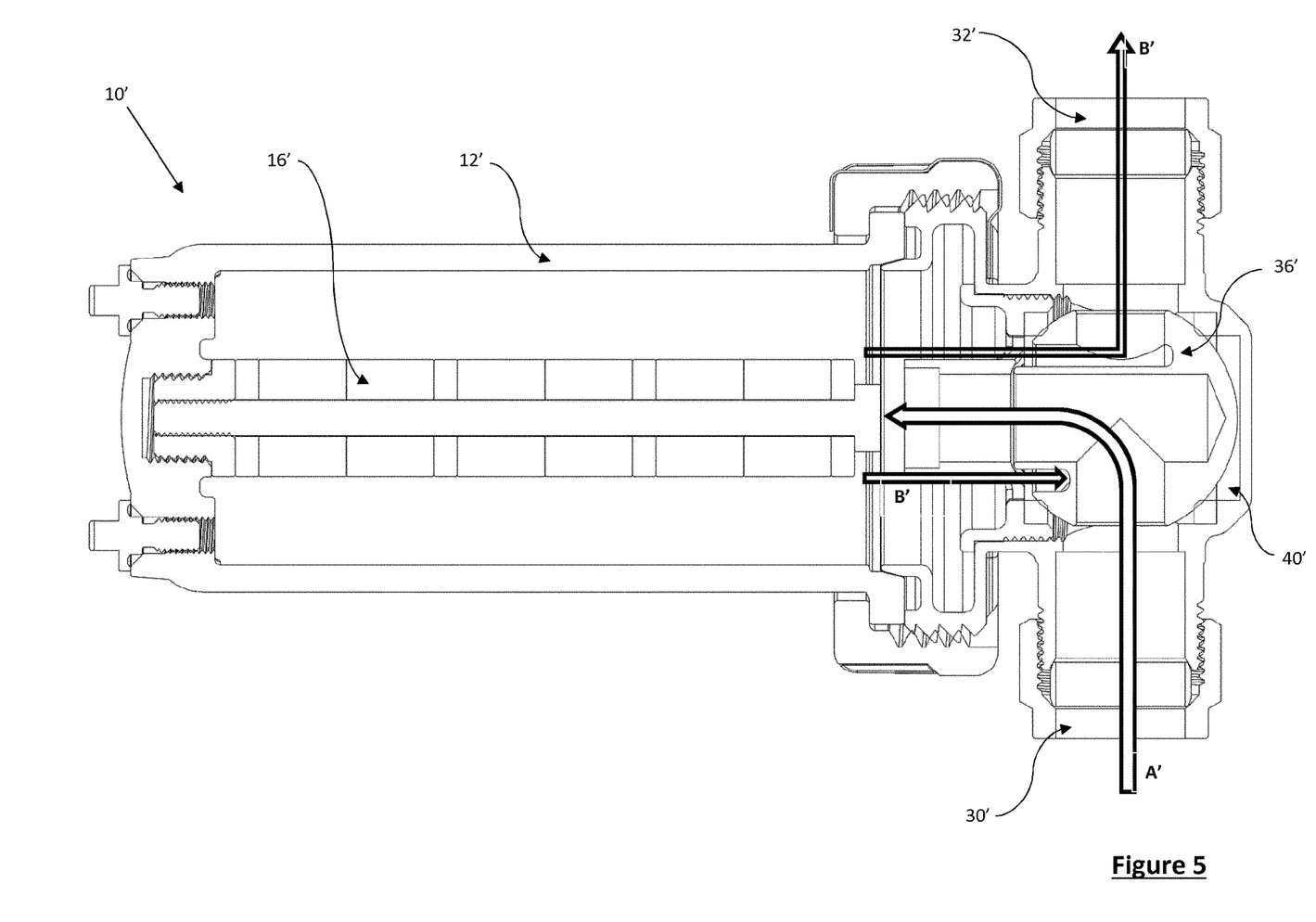
FIG. 5 is a cross section through the filter of FIG. 4, showing a valve in a first position.
Figure 6:
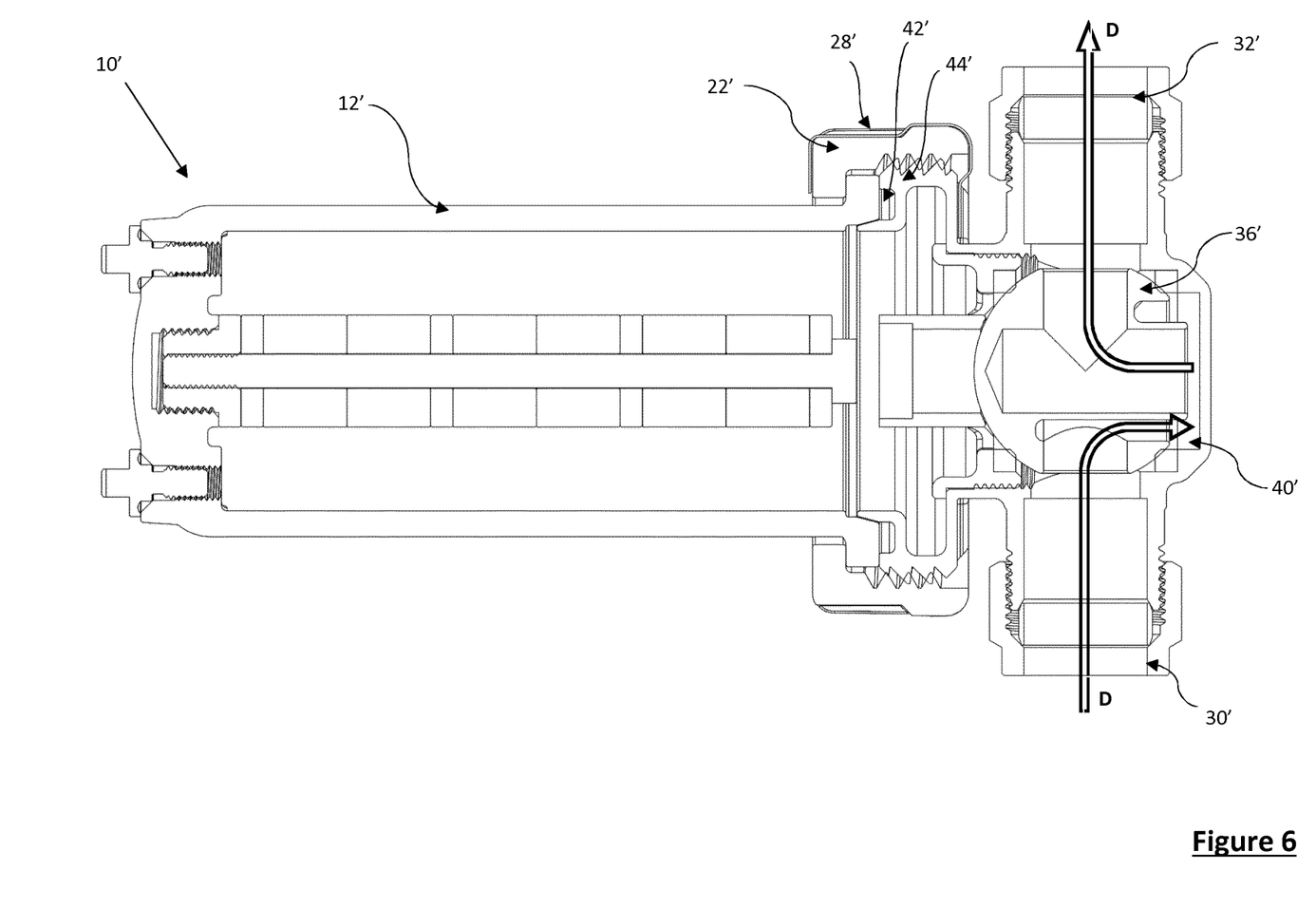
FIG. 6 is a cross section through the filter of FIG. 4, showing the valve in a second position.

Referring now to FIG. 5 and FIG. 6, the structure and operation of the ball valve 36' will now be described. Note that the ball valve 36', as well as the flow paths in the inlet 30' and outlet 32', are all substantially identical to the corresponding parts in the first embodiment of the filter 10. However a flow guide (18) is not provided in this embodiment, and the inlet to the separation chamber is central in this embodiment, with the outlet from the separation chamber back towards the valve being formed as a ring around the inlet and concentric with the inlet.

In FIG. 5, the ball valve 36' is shown in a first position, in which the inlet 30' is fluidly connected to the separation chamber, and the outlet 32' is also fluidly connected to the separation chamber. Fluid can therefore flow into the inlet, into the separation chamber where magnetic particles may be captured by the magnet 16', and then back out through the ball valve 36' to the outlet 32'. The ball valve includes two substantially right-angled passages for directing flow from the inlet to the separation chamber and from the separation chamber to the outlet.

To isolate the inlet and outlet 30', 32' from the separation chamber 12', the ball valve 36' can be rotated 180 degrees about an axis in line with the inlet 30' and outlet 32'. In this position, the right-angled passages at one end still face into the inlet and outlet 30', 32' of the filter, but at the other end the passages now face into a bypass chamber 40' in the valve body. This configuration is shown in FIG. 6. The separation chamber 12' is completely isolated from the inlet 30' and outlet 32' with the valve 36' in this second position. However, central heating system water can still flow into the inlet 30' and out of the outlet 32' through the passages in the ball valve 36' and through the bypass chamber 30' in the valve body (arrow D).

Figure 7:
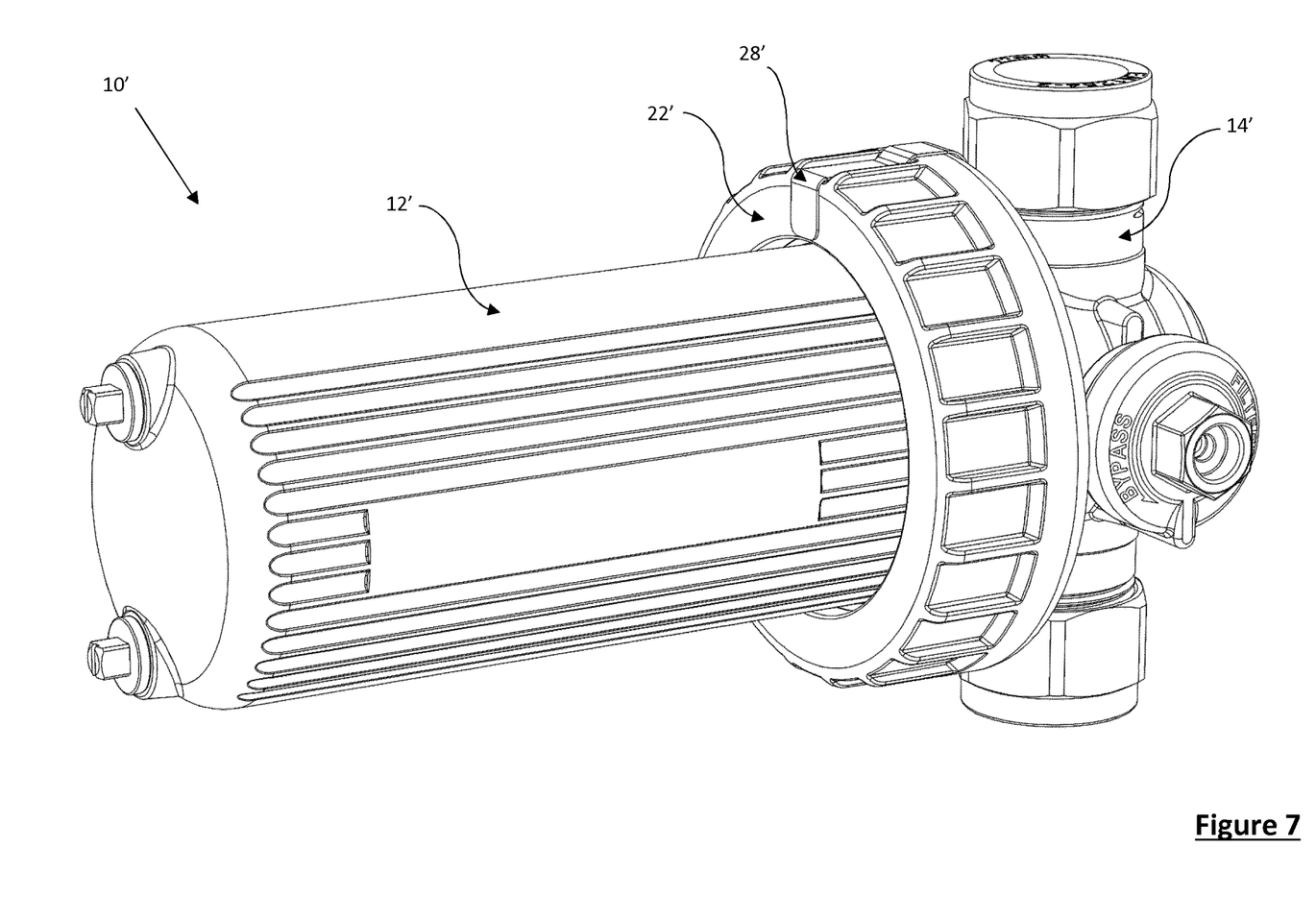
FIG. 7 is a perspective view of the filter of FIGS. 4-6.

FIG. 7 shows the second embodiment 10' fully assembled. Like the first embodiment, the separation chamber 12' is held in place on the fitment 14' by means of a threaded ring 22'. The threaded ring tightens behind the flange on the end of the separation chamber 12' to hold the separation chamber 12' onto the fitment. A removable clip 28' is provided to prevent unintentional loosening of the threaded ring 22' which might be caused for example by vibration in the central heating system pipes.

Referring back to FIG. 6, the interface between the flange of the canister 12' and the fitment 14' is visible in more detail. A compressible O-ring 42' is provided around a face of the fitment 14' which when assembled buts against the flange of the canister 12'. Radially outwards of the groove is a circumferential stop face 44'. The stop face 44' is a rigid part of the face of the fitment 14' which contacts the flange of the canister 12' and prevents compression of the O-ring 42' beyond a certain point. The depth of the groove is chosen to ensure that, when the canister 12' is fitted and the ring 22' is tightened, the O-ring provides a leak-proof seal, but that it cannot be tightened to the extent that it may become damaged.

Because the compression of the O-ring 42' is limited by the stop face 44', the amount of reaction provided by the O-ring to tension and lock the screw thread is limited. The clip 28' therefore serves to prevent the ring 22' from unscrewing due to vibration.

The filters described are particularly suited for installation and use where space is very limited. The single valve to isolate both the inlet and outlet substantially reduces the vertical space which may be required above or below a boiler to accommodate the filter. The 'slip socket' connection allows for very easy fitting, without needing to manipulate any of the pipes or remove and replace fixings which attach the pipes to the wall.

Various modifications will be apparent to the skilled person which fall within the scope of the invention. The invention is defined in the claims.

The invention claimed is:

1. A magnetic filter for a central heating system, the filter comprising:
   a separation chamber in the form of a canister having an open end,
   a magnet for capturing magnetic particles within the separation chamber,
   an inlet for fluidly connecting to a central heating system circuit,
   an outlet for fluidly connecting to the central heating system circuit, and
   a filter shut-off valve provided between the inlet, the outlet and the separation chamber, and operable to select between at least two positions, the filter shut-off valve in a first position fluidly connecting the inlet to the separation chamber and also fluidly connecting the outlet to the separation chamber and the filter shut-off valve in a second position isolating both the inlet and the outlet from the separation chamber, the open end of the canister fitting onto a fitment to close the canister, a bleed valve and a drain port being provided at the top and bottom respectively of the canister, and the filter shut-off valve between the inlet, the outlet and the separation chamber being movable between the first position and the second position by means of an external handle, in which the filter shut-off valve is a ball valve, the ball of the filter shut-off valve including two substantially right-angled passages for connecting the inlet and outlet respectively to the separation chamber, when the filter shut-off valve is in the first position, and the ball of the filter shut-off valve being provided within a valve housing which includes a bypass chamber disposed in the valve housing substantially opposite the separation chamber, and in which the filter shut-off valve in the second position isolates both the inlet and the outlet from the separation chamber but fluidly connects the inlet to the outlet via the bypass chamber.

2. The magnetic filter of claim 1, wherein a flow director is provided at an interface between the filter shut-off valve and the separation chamber, for separating inlet and outlet flow paths at the filter shut-off valve interface and to direct flow towards and around the magnet.

3. The magnetic filter of claim 1, wherein the magnet is disposed inside the separation chamber.

4. The magnetic filter of claim 1, wherein the ball of the filter shut-off valve is rotatable by substantially 180 degrees so that the ends of the right-angled passages which face into the separation chamber in the first position face into the bypass chamber in the second position.

5. A magnetic filter for a central heating system, the filter comprising:

a separation chamber in the form of a canister having an open end, a magnet for capturing magnetic particles within the separation chamber, an inlet for fluidly connecting to a central heating system circuit, an outlet for fluidly connecting to the central heating system circuit, and a filter shut-off valve provided between the inlet, the outlet and the separation chamber, and operable to select between at least two positions, the filter shut-off valve in a first position fluidly connecting the inlet to the separation chamber and also fluidly connecting the outlet to the separation chamber and the filter shut-off valve in a second position isolating both the inlet and the outlet from the separation chamber, the open end of the canister fitting onto a fitment to close the canister, in which the filter shut-off valve is a ball valve, the ball of the filter shut-off valve including two substantially right-angled passages for connecting the inlet and outlet respectively to the separation chamber, when the filter shut-off valve is in the first position, a bleed valve and a drain port being provided at the top and bottom respectively of the canister, and the filter shut-off valve between the inlet, the outlet and the separation chamber being movable between the first position and the second position by means of an external handle.

6. The magnetic filter of claim 5, wherein the filter shut-off valve in the second position isolates both the inlet and the outlet from the separation chamber but fluidly connects the inlet to the outlet.

7. The magnetic filter of claim 5, wherein the ball of the filter shut-off valve is provided within a valve housing which includes a bypass chamber.

8. The magnetic filter of claim 7, wherein the bypass chamber is disposed in the valve housing substantially opposite the separation chamber.

9. The magnetic filter of claim 8, wherein a flow director is provided at an interface between the filter shut-off valve and the separation chamber, for separating inlet and outlet flow paths at the valve interface and to direct flow towards and around the magnet.

10. The magnetic filter of claim 5, wherein the magnet is disposed inside the separation chamber.

11. The magnetic filter of claim 7, wherein the ball of the filter shut-off valve is rotatable by substantially 180 degrees so that the ends of the right-angled passages which face into the separation chamber in the first position face into the bypass chamber in the second position.

* * * * *